March 7, 1950  J. COMPTON  2,499,724
COMPOSITE STRUCTURE AND METHOD OF PRODUCING SAME
Filed May 17, 1944
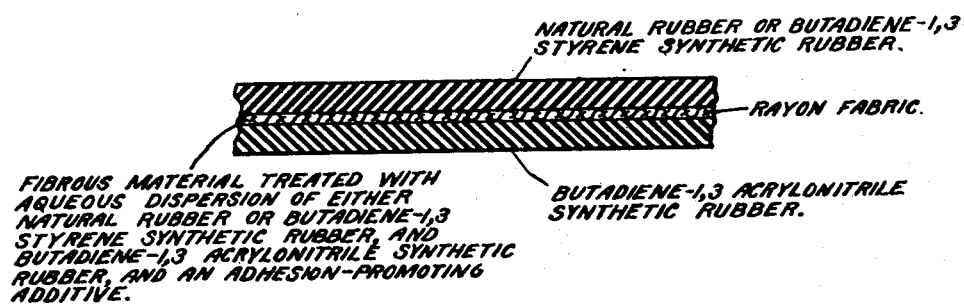
Inventor
Jack Compton
By Harold J. Meyer
Atty.

Patented Mar. 7, 1950

2,499,724

UNITED STATES PATENT OFFICE 2,499,724

COMPOSITE STRUCTURE AND METHOD OF PRODUCING SAME

Jack Compton, Cuyahoga Falls, Ohio, assignor to The B. F. Goodrich Company, New York, N. Y., a corporation of New York Application May 17, 1944, Serial No. 536,051

11 Claims. (Cl. 154—136)

1

This invention relates to a composite structure in which dissimilar rubbery materials are adhered to opposite sides of the same fibrous material, and to a method of producing the same.

It is known that the adhesion of fibrous materials such as yarns, cords and fabrics made of cotton, rayon, nylon, silk and other textile materials, to natural rubber may be materially increased by treating the fibrous material, prior to bringing it in adhering relation with the rubber, with an aqueous dispersion of natural rubber or rubber latex also containing adhesion promoting additives such as casein and other proteins, or materials which react to form insoluble, infusible resins such as resorcinol and formaldehyde.

When this method of treatment has been applied to fibrous materials to improve their adhesion to synthetic rubbers, however, considerable difficulties have been encountered. Thus, it has been found that the treatment of rayon fabric for instance, with aqueous dispersions of natural rubber containing an adhesion promoting additive, does not appreciably improve the adhesion between rayon and oil-resisting synthetic rubber of the butadiene-1,3 acrylic nitrile copolymer type. Moreover, it has been found that the substitution of synthetic rubber latices for the natural latex in the fiber-treating dispersion does not always enable satisfactory adhesions between fibrous materials and either natural or synthetic rubbers to be obtained, particularly if the type of synthetic rubber present in the latex is different from the type of rubber to be adhered to the fibrous material in the final product.

These difficulties have rendered it particularly troublesome to produce a composite structure in which dissimilar rubbery materials are adhered to opposite sides of the same fibrous material. For example, in the production of self-sealing gasoline tanks and fuel cells it is often desirable to provide a layer of oil-resisting synthetic rubber on one side of a strength-giving fibrous material and to provide a layer of rubbery material which will swell in gasoline on the other side of the fibrous material, but this has been most difficult since the two types of rubbery material do not adhere to each other nor do they satisfactorily adhere to the fibrous material unless the fibrous material is specially treated, and since treatments designed to increase the adhesion of the fibrous materials to one of the two dissimilar types of rubbery material generally do not improve the adhesion to the other type of rubbery material.

2

I have now discovered a method by which fibrous materials may be tightly adhered to two dissimilar rubbery materials one of which is an oil-resisting synthetic rubber of the butadiene-1,3 acrylic nitrile copolymer type and the other of which is a vulcanizable rubbery hydrocarbon polymer which is swelled by gasoline and oils such as the various natural rubbers (which are hydrocarbon polymers), polymers of butadiene-1,3, isoprene, 2,3-dimethyl butadiene-1,3 and other butadiene-1,3 hydrocarbon polymers, and copolymers of such hydrocarbons with one another or with other copolymerizable hydrocarbons such as styrene, isobutylene and the like.

This method consists in treating fibrous materials with an aqueous dispersion containing both a vulcanizable rubbery hydrocarbon polymer and a butadiene-1,3 acrylic nitrile copolymer, as well as an adhesion promoting additive, drying the so-treated fibrous material, interposing the so-treated fibrous material between a layer of a vulcanizable rubbery hydrocarbon polymer and a layer of a butadiene-1,3 acrylic nitrile copolymer, and then vulcanizing the assembly.

In this way there are produced composite products comprising a rubbery hydrocarbon polymer swellable by gasoline and oils, and an oil-resisting copolymer of butadiene-1,3 and acrylic nitrile each tightly adhered to opposite sides of the same fibrous material. One such product is illustrated in the accompanying drawing, the sole figure of which shows a butadiene-1,3 styrene synthetic rubber and a butadiene-1,3 acrylonitrile synthetic rubber adhered to opposite sides of a rayon fabric.

The adhesion so produced between the fibrous material and each of the two rubbery materials is excellent, and is entirely unexpected since the effect of the presence of both a rubbery hydrocarbon polymer and a butadiene-1,3 acrylic nitrile copolymer in the aqueous dispersion used to treat the fibrous material, is synergistic in nature, the amount of adhesion between each of the rubbery materials and the fibrous material in the final product being greater than that obtained between the fibrous material and either of the rubbery materials when using only one of the two rubbery materials in the aqueous dispersion.

As an example of the method of practicing the invention, 25.5 parts of a synthetic rubber latex prepared by copolymerizing butadiene-1,3 and styrene in the ratio of 3 parts butadiene-1,3 to 1 part styrene in an aqueous emulsion containing soap as the emulsifying agent, and containing 28% by weight of a rubbery butadiene-1,3 styrene hydrocarbon copolymer, is admixed with 25.5 parts of an oil-resisting synthetic rubber latex prepared by copolymerizing butadiene-1,3 and acrylonitrile in the ratio of 55 parts of butadiene-1,3 to 45 parts of acrylonitrile in an aqueous emulsion, containing 28% by weight of a butadiene-1,3 acrylonitrile copolymer. The resulting mixed dispersion or latex containing equal parts of butadiene-1,3 styrene copolymer and butadiene-1,3 acrylonitrile copolymer is diluted with water to a total of 71.4 parts and is then mixed with 28.6 parts of an aqueous dispersion containing 20% by weight of dispersed casein. The 100 parts of aqueous dispersion thus obtained contains 5.7 parts of casein, 7.1 parts of butadiene-1,3 styrene copolymer and 7.1 parts of butadiene-1,3 acrylonitrile copolymer, a ratio of the two rubbery copolymers to each other of 1:1 and a ratio of casein to total rubbery material of 1:2.5, with about 20% by weight of total dispersed material. The dispersion also contains, of course, dispersing agent, in this case soap, to maintain the casein and rubbery materials dispersed in the aqueous phase.

The mixed dispersion obtained above is heated to 150° F. with efficient stirring, and while so heated rayon fabric consisting of woven or weak-wefted yarns or cords composed of regenerated cellulose made by the viscose process, are immersed therein. The so-treated rayon fabric is then dried either at room temperature or in a heated oven. The rayon fabric is then interposed between a layer of a vulcanizable natural rubber compound and a layer of vulcanizable oil-resisting butadiene-1,3 acrylonitrile synthetic rubber compound as by calendering, spreading or the like and the assembly so obtained is vulcanized.

The resulting composite structure consists of natural rubber and oil-resisting butadiene-1,3 acrylonitrile synthetic rubber tightly adhered to opposite sides of the same rayon fabric, and is extremely useful as the outer covering member for self-sealing gasoline tanks, fuel cells and the like since the outer layer of oil-resisting synthetic rubber is highly resistant to abrasion and to the deteriorating influence of gasoline which may be spilled on the outer parts of the tank, the rayon reinforces the rubbery materials giving strength to the structure and the inner layer of natural rubber is easily adhered to the self-sealing member of the tank. The structure is also useful for various other purposes in the construction of rubber articles of various kinds including hose, belting, tires and the like.

When the above prepared composite structure is tested on a Cooey testing machine to determine the adhesion per linear inch between the fabric and the two different rubbers, it is found that an adhesion of 10.5 lbs. between the rayon fabric and the natural rubber composition is obtained and that an adhesion of 9.5 lbs. between the rayon fabric and the oil-resisting butadiene-1,3 acrylonitrile synthetic rubber is obtained.

When the above example is repeated, however, using no butadiene-1,3 acrylonitrile latex in the dispersion used to treat the fibers, but instead using a 20% dispersion of casein and the same butadiene-1,3 styrene copolymer latex as before, with a ratio of casein to rubbery material of 1:2.5, as before, the adhesion when determined as before, between the butadiene-1,3 acrylonitrile copolymer and the fabric is quite insufficient for practical use, being only 3.5 lbs. while the adhesion between the natural rubber and the fabric is also lower, being only 8.5 lbs. On the other hand, when the example is repeated using no butadiene-1,3 styrene latex in the dispersion, but instead using a 20% dispersion of casein and the same butadiene-1,3 acrylonitrile latex as in the example, with a ratio of casein to rubbery material of 1:2.5, the adhesion between the natural rubber composition and the rayon fabric is very poor, being only 2.5 lbs., although an adhesion of around 10 lbs. between the oil-resisting synthetic rubber and the fabric is secured.

It is apparent from the foregoing that the use of both a butadiene-1,3 styrene copolymer and a butadiene-1,3 acrylonitrile copolymer in the dispersion used to treat the rayon enables excellent adhesion of rayon to both rubbery hydrocarbon polymers and oil-resisting butadiene-1,3 acrylonitrile copolymers to be obtained, and that the adhesion obtained to either of these materials is as good or better than that obtained when the material to which the rayon is to be adhered is the only rubbery material present in the treating dispersion.

Although the above example constitutes a preferred embodiment of the invention, the invention is by no means limited thereto for numerous variations and modifications in the nature and proportions of the materials present in the treating dispersion, in the nature of the fibrous material treated with the dispersion and in the rubbery materials adhered to the fibrous material may be made while still obtaining the results described.

Thus, instead of employing a mixture of a butadiene-1,3 styrene copolymer latex and a butadiene-1,3 acrylonitrile copolymer latex in the treating dispersion, other dispersions containing any vulcanizable rubbery hydrocarbon polymer and any butadiene-1,3 acrylic nitrile copolymer may be employed. Examples of vulcanizable rubbery hydrocarbon polymers include, in addition to copolymers of butadiene-1,3 and styrene, any other polymers of butadiene-1,3 hydrocarbons such as butadiene-1,3, isoprene, 2,3-dimethyl butadiene-1,3, piperylene and the like or any copolymers of such butadiene-1,3 hydrocarbons with each other or with any desired proportions of other copolymerizable hydrocarbons such as isobutylene, styrene, vinyl naphthalene and the like. Since natural rubber may be considered as a polymer of isoprene, the natural rubbers are also of course included in this class. Reclaimed natural rubber and reclaimed hydrocarbon polymer synthetic rubbers are also included as vulcanizable rubbery-hydrocarbon polymers.

Examples of copolymers of butadienes-1,3 and acrylic nitriles include, in addition to copolymers of butadiene-1,3 and acrylonitrile, other copolymers of any desired proportion of any butadiene-1-3 including not only butadiene-1,3 itself but also isoprene, 2,3-dimethyl butadiene-1,3, piperylene, 2-chlorobutadiene-1-3, and the like with any desired proportion of any acrylic nitrile including not only acrylonitrile but also methacrylonitrile, ethacrylonitrile, alpha-chloroacrylonitrile and the like.

Such polymers and copolymers may be prepared by polymerization in aqueous emulsion, (or, in the case of natural rubber, from the rubber tree), in which case they are obtained as latices and may be used as such in the aqueous dispersions used to treat fibrous material according to this invention. Alternatively they may be prepared by other methods and artificially dispersed to form the treating dispersions.

The treating dispersion also contains, in addition to the rubbery materials, an adhesion-promoting additive agent such as the casein used in the example. In place of casein, however, numerous other materials commonly employed in dispersions used to treat fibrous material to improve the adhesion of the fibrous material to rubbery materials, and well known to the prior art as adhesion promoting additives, may also be employed. Among these, there may be mentioned, in addition to casein, other proteins such as the alpha-protein obtained from soybeans, albumen, and the like; deacetylated chitin; and materials which react to form insoluble, infusible resins such as combinations of aldehydes such as formaldehyde and acetaldehyde with other compounds capable of condensing with aldehydes including phenols such as phenol, resorcinol, pyrogallol and the like, ketones such as acetone, methyl ethyl ketone and the like, amines such as aniline and dimethyl aniline and amides such as urea, cyanamide and the like.

The amounts of these various materials present in the treating dispersion may also be varied widely. Thus, the total amount of rubbery materials and adhesion promoting additives is not critical and may vary from as little as 5% or less to 50% or more of the dispersion, but it is preferred that these materials make up from 10 to 40% by weight of the dispersion. Moreover, the ratio of the amounts of the rubbery materials to the adhesion-promoting additives may also be varied widely, but it is preferred that the amount of the former be from 1 to 5 times that of the latter. The ratio of the amounts of the two different rubbery materials present, that is, the vulcanizable rubbery hydrocarbon polymer and the butadiene-1,3 acrylic nitrile copolymer, may also be varied widely. Ratios of the former to the latter of from 1 to 9 or less to 9:1 or more are capable of giving results of the character described but best results are secured when the ratio of the former to the latter is from 1:5 to 1:1. For example, the use of a ratio of butadiene-1,3 styrene copolymer to butadiene-1,3 acrylonitrile copolymer in the example described above of 1:3 produced a composite structure in which the adhesion of each of the two rubbery materials to the rayon fabric was about 12 lbs.

The fibrous material treated with the treating dispersion may consist of yarns, cords or fabric composed of naturally occurring fibers such as cotton, silk, ramie and other bast fibers and the like, or fibers of synthetic organic fiber-forming materials such as rayon, by which is meant regenerated cellulosic fibers or filaments whether made by the viscose, cuprammonium or acetate process; nylon, by which is meant synthetic linear polyamides such as polyhexamethylene adipamide; and other synthetic fiber-forming polymers or resins as well as fibrous materials prepared from glass, metals, and other materials.

The treatment of such fibrous materials with the treating dispersion is preferably carried out by immersing the fibrous material in heated treating dispersion, as in the example, but this is not necessary since treatments at room temperature may be used.

The two dissimilar rubbery materials adhered to the treated fibrous material may also be varied widely so long as one of the rubbery materials is a vulcanizable rubbery hydrocarbon polymer and the other is a copolymer of a butadiene-1,3 and an acrylic nitrile. Examples of these two types of rubbery materials are disclosed hereinabove in connection with the variation of the rubbery materials present in the treating dispersion, and are not repeated here. When such rubbery materials are associated with the treated fibrous material and the assembly then vulcanized to form the composite structures of this invention, the rubbery materials will of course contain vulcanizing agents such as sulfur together if desired with any other of the compounding ingredients well known to the art. Vulcanization is effected in the conventional manner.

Other modifications and variations will occur to those skilled in the art and are within the spirit and scope of the invention as defined by the appended claims.

I claim:

1. The method of producing a composite structure in which a vulcanizable natural rubber and a rubbery butadiene-1,3 acrylonitrile copolymer are adhered to opposite sides of the same fibrous material composed of synthetic organic fiber-forming materials, which comprises treating such a fibrous material with an aqueous dispersion containing a rubbery butadiene-1,3 styrene copolymer, a rubbery butadiene-1,3 acrylonitrile copolymer, and an adhesion promoting additive, drying the treated fibrous material, interposing the fibrous material between a layer of vulcanizable natural rubber and a layer of vulcanizable rubbery butadiene-1,3 acrylonitrile copolymer, and vulcanizing the assembly.

2. The method of claim 1 wherein the fibrous material is rayon fabric.

3. The method of claim 1 wherein the adhesion promoting additive is casein.

4. The method of producing a composite structure in which vulcanizable rubbery butadiene-1,3 styrene copolymer and rubbery butadiene-1,3 acrylonitrile copolymer are adhered to opposite sides of rayon fabric, which comprises treating the rayon fabric with an aqueous dispersion containing a mixture of synthetic rubber latex prepared by copolymerizing butadiene-1,3 and styrene in aqueous emulsion, a synthetic rubber latex prepared by copolymerizing butadiene-1,3 and acrylonitrile in aqueous emulsion, and casein, drying the so-treated rayon fabric, interposing the rayon fabric between a layer of vulcanizable rubbery butadiene-1,3 styrene copolymer and a layer of vulcanizable rubbery butadiene-1,3 acrylonitrile copolymer, and vulcanizing the assembly.

5. The method of adhering a vulcanizable natural rubber composition to a rayon fabric which comprises treating the rayon fabric with an aqueous dispersion containing a mixture of synthetic rubber latex prepared by copolymerizing butadiene-1,3 and styrene in aqueous emulsion, a synthetic rubber latex prepared by copolymerizing butadiene-1,3 and acrylonitrile in aqueous emulsion, and an adhesion promoting additive, drying the so-treated rayon fabric, associating it with a body of vulcanizable natural rubber, and vulcanizing the assembly.

6. The method of adhering a vulcanizable butadiene-1,3 acrylonitrile copolymer synthetic rubber to rayon fabric which comprises treating the rayon fabric with an aqueous dispersion containing a mixture of synthetic rubber latex prepared by copolymerizing butadiene-1,3 and styrene in aqueous emulsion, a synthetic rubber latex prepared by copolymerizing butadiene-1,3 and acrylonitrile in aqueous emulsion, and an adhesion promoting additive, drying the so-treated rayon fabric, associating it with a body of vulcanizable rubber butadiene-1,3 acrylonitrile copolymer, and vulcanizing the assembly.

7. The method of producing a composite structure which comprises treating a fibrous material with an aqueous dispersion containing a rubbery hydrocarbon polymer selected from the class consisting of natural rubber and rubbery copolymer of butadiene-1,3 and styrene, an oil-resisting rubbery copolymer of a butadiene-1,3 with an acrylic nitrile, and an adhesion promoting additive, drying the so-treated fibrous material, interposing the fibrous material between a layer of vulcanizable rubbery hydrocarbon polymer selected from the class consisting of natural rubber and rubbery copolymer of butadiene-1,3 and styrene and a layer of vulcanizable oil-resisting rubbery copolymer of a butadiene-1,3 and an acrylic nitrile, and thereafter vulcanizing the assembly.

8. A composite structure comprising rayon fabric coated with an adhesive composition comprising a rubbery hydrocarbon polymer selected from the class consisting of natural rubber and rubbery butadiene-styrene copolymer, a rubbery butadiene-acrylonitrile copolymer, and an adhesion promoting additive, said coated fabric having a vulcanized natural rubber composition tightly adhered thereto.

9. A composite structure comprising a vulcanized rubbery butadiene-acrylonitrile copolymer composition tightly adhered to rayon fabric by means of an adhesive composition coating said fabric, said adhesive composition comprising a rubbery hydrocarbon polymer selected from the class consisting of natural rubber and rubbery butadiene-styrene copolymer, a rubbery butadiene-acrylonitrile copolymer, and an adhesion promoting additive.

10. A composite structure comprising a vulcanized natural rubber composition and a vulcanized rubbery butadiene-acrylonitrile copolymer composition tightly adhered to opposite sides of rayon fabric by means of an adhesive composition comprising a rubbery hydrocarbon polymer selected from the class consisting of natural rubber and rubbery butadiene-styrene copolymer, a rubbery butadiene-acrylonitrile copolymer, and an adhesion promoting additive.

11. A composite structure comprising a vulcanized natural rubber composition and a vulcanized rubbery butadiene-acrylonitrile composition tightly adhered to opposite sides of rayon fabric by means of an adhesive composition coating said fabric, said adhesive composition comprising a rubbery butadiene-styrene copolymer, a rubbery butadiene-acrylonitrile copolymer, and casein.

JACK COMPTON.

REFERENCES CITED

The following references are of record in the file of this patent:

UNITED STATES PATENTS

| Number | Name | Date |
|---|---|---|
| 1,998,827 | Worrell | Apr. 23, 1935 |
| 2,128,229 | Charch | Aug. 30, 1938 |
| 2,211,959 | Maney | Aug. 20, 1940 |
| 2,271,125 | Juve | Jan. 27, 1942 |
| 2,278,802 | Sarbach | Apr. 7, 1942 |
| 2,395,071 | Sarbach | Feb. 19, 1946 |
| 2,411,878 | Hershberger | Dec. 3, 1943 |
| 2,412,148 | Hershberger | Dec. 3, 1946 |
| 2,417,792 | Verbanc | Mar. 18, 1947 |
| 2,425,514 | Dasher | Aug. 12, 1947 |
| 2,429,397 | Compton et al. | Oct. 21, 1947 |
| 2,430,931 | Hershberger | Nov. 18, 1947 |
| 2,442,068 | Wolf | May 25, 1948 |